United States Patent [19]

Furukawa et al.

[11] Patent Number: 5,111,670
[45] Date of Patent: May 12, 1992

[54] ABSORPTION REFRIGERATION SYSTEM

[75] Inventors: Masahiro Furukawa; Kazuhiro Yoshii; Masayuki Oonou, all of Oizumi, Japan

[73] Assignee: Sanyo Electric Co., Ltd., Osaka, Japan

[21] Appl. No.: 615,580

[22] Filed: Nov. 19, 1990

[30] Foreign Application Priority Data

Nov. 20, 1989 [JP] Japan .................. 1-134630
Nov. 20, 1989 [JP] Japan .................. 1-301119

[51] Int. Cl.⁵ .......................................... F25B 43/04
[52] U.S. Cl. ..................................... 62/475; 62/476
[58] Field of Search ............... 62/475, 476, 101, 85

[56] References Cited

U.S. PATENT DOCUMENTS 3,367,135  2/1968  Greacen et al. .............. 62/475
3,597,936  8/1971  Dyre .................................. 62/475
4,100,755  7/1978  Leonard ........................... 62/104

FOREIGN PATENT DOCUMENTS 60-240972  11/1955  Japan .
52-51317   11/1977  Japan .

Primary Examiner—Henry A. Bennet
Assistant Examiner—John Sollecito
Attorney, Agent, or Firm—Darby & Darby

[57] ABSTRACT

An absorption refrigeration system having an absorption refrigeration cycle which is formed by connecting a plurality of absorbers, a regenerator, a condenser and an evaporator with one another by means of pipes; the absorption refrigeration system comprising ejectors for bleeding a noncondensing gas accumulated in each the absorbers and a noncondensing gas tank for storing the noncondensing gas which is bled therein, both of which are provided for each absorber.

10 Claims, 2 Drawing Sheets

ABSORPTION REFRIGERATION SYSTEM

BACKGROUND OF THE INVENTION

1. Field of the Invention

The present invention relates to an absorption refrigeration system, and more particularly to a bleeding structure of the absorption refrigeration system having a plurality of absorbers.

2. Prior Art

For example, Japanese Unexamined Patent Publication No. 60-240972 has disclosed a noncondensing gas discharging device of an absorption refrigeration system wherein a noncondensing gas (which is a hydrogen gas mainly, or in which a nitrogen gas, an oxygen gas or a carbon dioxide gas may be contained) in a drum is bled in a bleeding chamber together with refrigerant vapor, and then is separated from the refrigerant vapor in a separation chamber so as to be stored in a container.

Furthermore, Japanese Utility Model Publication No. 52-51317 has disclosed an absorption refrigeration system wherein an evaporation absorption drum has an evaporator provided in the center thereof and the evaporator has absorbers provided on both sides thereof so as to absorb a refrigerant vaporized by the evaporator.

By way of example, there has been proposed that the noncondensing gas discharging device disclosed in the Japanese Unexamined Patent Publication No. 60-240972 is provided on the absorption refrigeration system and the bleeding chamber of the noncondensing gas discharging device is connected to each of the absorbers by means of pipes so as to discharge the noncondensing gas in the absorption refrigeration system disclosed in the Japanese Utility Model Publication No. 52-51317. As described above, in a case in which the bleeding chamber of the noncondensing gas discharging device is connected to each of the absorbers by means of the pipes, the noncondensing gas is drawn from only one of the absorbers into the bleeding chamber when the noncondensing gas enters one of the absorbers from the outside so as to increase a pressure thereof. Therefore, the noncondensing gas is not drawn from the other absorber. Consequently, there is caused a problem that a pressure of the noncondensing gas in the other absorber is increased so that an ability for absorbing the refrigerant is lowered and a coefficient of performance of the absorption refrigeration system is greatly reduced.

SUMMARY OF THE INVENTION

It is an object of the present invention to provide an absorption refrigeration system having a plurality of absorbers wherein the noncondensing gas is bled from each of the absorbers and the coefficient of performance is not reduced greatly even if a large quantity of the noncondensing gas is generated.

The present invention provides an absorption refrigeration system having an absorption refrigeration cycle which is formed by connecting a plurality of absorbers, a regenerator, a condenser and an evaporator with one another by means of pipes; the absorption refrigeration system comprising a noncondensing gas bleeding portion for bleeding a noncondensing gas accumulated in each the absorbers and a noncondensing gas tank for storing the noncondensing gas which is bled therein, both of which are provided for each absorber.

In other words, the absorption refrigeration system of the present invention comprises a plurality of noncondensing gas tanks connected to the plurality of absorbers by means of the pipes for bleeding the noncondensing gas from the absorbers and then storing the same therein. Therefore, even if a pressure difference is made between the absorbers, the noncondensing gas can continuously be bled from the absorbers by the noncondensing gas tanks. In addition, even if a large quantity of the noncondensing gas enters one of the absorbers so that a pressure is increased, the noncondensing gas can be bled from the other absorber by the noncondensing gas tanks irrespective of the increase in pressure. Consequently, it becomes possible to prevent the coefficient of performance from being greatly reduced due to the storage of the noncondensing gas in the absorbers.

In the absorption refrigeration system of the present invention, the condenser can provide noncondensing gas bleeding portions (for example, ejectors) and the plurality of noncondensing gas tanks for storing the noncondensing gas bled by the noncondensing gas bleeding portions. Consequently, the noncondensing gas can continuously be bled from the absorbers and the condenser having a different pressure by the noncondensing gas bleeding portions so as to store the same in the noncondensing gas tanks. In addition, even if the noncondensing gas enters the absorbers or the condenser so that the pressure is increased, the noncondensing gas can be bled from the plurality of absorbers or the condenser by the noncondensing gas bleeding portions. Furthermore, it is possible to prevent the interference by the absorbers or the condenser having higher pressures. Consequently, it is possible to prevent the coefficient of performance from being reduced greatly.

DETAILED DESCRIPTION OF PREFERRED EMBODIMENTS

There will be described one embodiment of the present invention with reference to the drawings.

There is shown a double effect absorption refrigeration system. Water ($H_2O$) is used for a refrigerant. Lithium bromide (LiBr) solution is used for an absorbent (absorbent solution).

Figure 1:
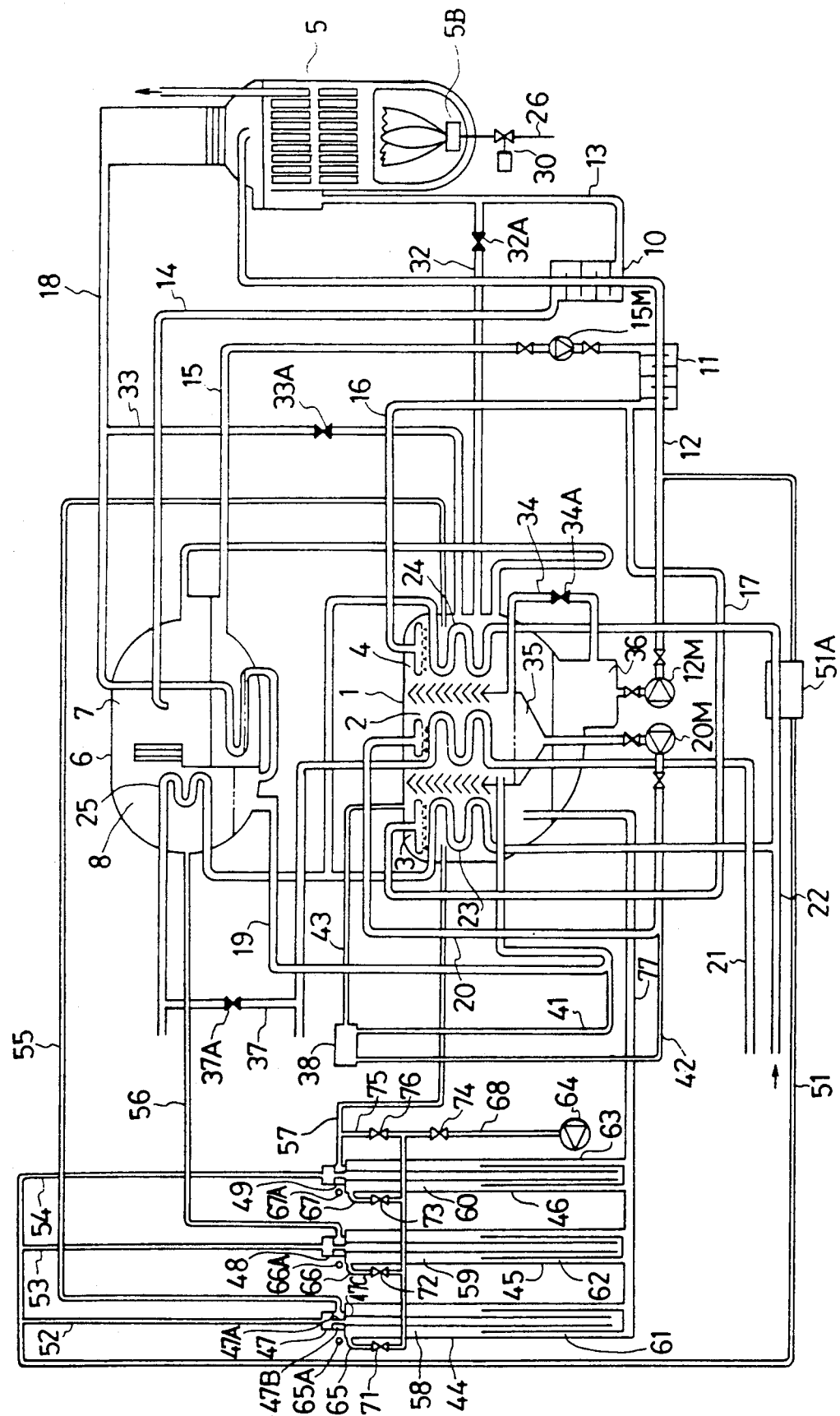
FIG. 1 is a circuit diagram of an absorption refrigeration system according to one embodiment of the present invention.

In FIG. 1, the reference numeral (1) denotes an evaporation absorption unit. The reference numeral (2) denotes an evaporator which is provided in the center of the evaporation absorption unit (1). The reference numerals (3) and (4) denote absorbers which are provided on both sides of the evaporator (2), respectively. The reference numeral (5) denotes a high temperature generator having a gas burner (5B). The reference numeral (6) denotes a regenerative condensation unit. The reference numerals (7) and (8) denote a low temperature generator and a condenser which are provided in the regeneration condensation unit (6), respectively. The reference numeral (10) denotes a high temperature heat exchanger. The reference numeral (11) denotes a low temperature heat exchanger. The reference numerals (12) to (17) denote absorption liquid pipes. The reference numeral (15M) denotes an absorption liquid return pump. The reference numeral (12M) denotes an absorption liquid feed pump. The reference numerals (18) to (20) denote refrigerant pipes. The reference numeral (20M) denotes a refrigerant pump. The reference numeral (21) denotes a cold water pipe. As shown in FIG. 1, they are respectively connected to one another by means of pipes so as to constitute an absorption refrigeration cycle. The reference numeral (22) denotes a cooling water pipe. Absorber heat exchangers (23) and (24) and a condenser heat exchanger (25) are provided on the cooling water pipe (22). The reference numeral (26) denotes a fuel pipe which is connected to the gas burner (5B). The reference numeral (30) denotes a fuel control valve.

The reference numeral (32) denotes an intermediate absorption liquid return pipe. The reference numeral (33) denotes a refrigerant return pipe. The reference numeral (34) denotes an overflow pipe which is connected between a refrigerant reservoir (35) and an absorption liquid reservoir (36). The refernce numeral (37) denotes a communication pipe which is connected between the cold water pipe (21) and the cooling water pipe (22). Each of the pipes has switching valves (32A), (33A), (34A) and (37A) provided thereon. The switching valves (32A), (33A), (34A) and (37A) are closed when the cold water is supplied to an air-conditioning load, while they are opened when hot water is supplied to the air-conditioning load. The reference numeral (38) denotes a refrigerant tank which is connected to the refrigerant pipes (19) and (20) and the evaporation absorption unit (1) by means of pipes (41), (42) and (43).

Figure 2:
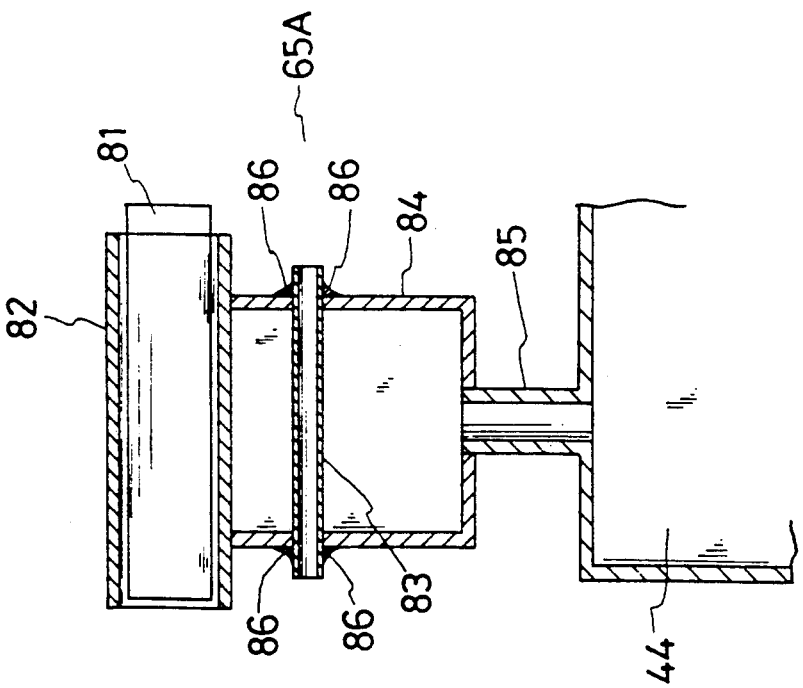
FIG. 2 is a partially enlarged explanatory diagram.

The reference numerals (44), (45) and (46) denote noncondensing gas tanks for storing a noncondensing gas or a noncondensable gas (which is a hydrogen gas mainly, or in which a nitrogen gas, an oxygen gas or a carbon dioxide gas may be contained) reserved in the absorbers (3) and (4) and the condenser (8). The gas tanks (44), (45) and (46) have ejectors (47), (48) and (49) provided on their top portions. For example, the ejector (47) includes a nozzle (47A), a suction chamber (47B) and a stream-down tube (47C). Absorption liquid feed pipes (51), (52), (53) and (54) are connected between nozzles of the ejectors (47), (48) and (49) and the absorption liquid pipe (12) on the discharge side of the absorption liquid pump (12M), respectively. The reference numeral (51A) denotes a heat exchanger through which the diluted absorption liquid is cooled by the cooling water. In addition, bleeding pipes (55), (56) and (57) are connected between suction chambers of the ejectors (47), (48) and (49), and the absorber (4), the condenser (8) and the absorber (3), respectively. The reference numerals (58), (59) and (60) denote reservoirs for storing the noncondesing gas in the noncondensing gas tanks (44), (45) and (46). The reference numerals (61), (62) and (63) denote separation chambers for separating the noncondensing gas from the absorbent solution. Particularly as shown in FIG. 2, palladium cells (65A), (66A) and (67A) for discharging a hydrogen gas are provided on the top portions of the noncondensing gas tanks (44), (45) and (46). Discharge pipes (65) to (68) are connected between the reservoirs (58), (59) and (60) and a discharge pump (64), respectively. Switching valves (71) to (74) are provided in the middle of the discharge pipes (65) to (68). A pipe (75) is connected between the bleeding pipe (57) and the discharge pipe (68). A switching valve (76) is provided in the middle of the pipe (75). An absorption liquid return pipe (77) is connected between the bottom portions of the noncondensing gas tanks (44), (45) and (46) and the absorber (3).

In FIG. 2, the palladium cell (65A) includes a container portion (84), a palladium pipe (83) as a palladium wall which penetrates the container portion (84), a heater (81), a portion (82) for attaching the heater (81) and a pipe (85) for connecting the container portion (84) to the noncondensing gas tank (44). The palladium pipe (83) which is heated by the heater (81) so as to reach a predetermined temperature discharges the hydrogen gas to the outsides through a pipe wall suitably. The reference numeral (86) denotes a welded portion.

While the absorption refrigeration system is operated, the refrigerant evaporated in the high temperature generator (5) flows to the condenser (8) by way of the low temperature generator (7), heat-exchanged with the water which flows through the condenser and heat exchanger (25) so as to be condensed and liquefied, and then flows to the evaporator (2) through the refrigerant pipe (19), in similar to the conventional absorption refrigeration system. The refrigerant is heat-exchanged with the water in the cold water pipe (21) so as to be evaporated, and the heat of vaporization causes the water in the cold water pipe (21) to be cooled. Then, the cold water is circulated to a load so that an air-conditioning operation is carried out. The refrigerant evaporated in the evaporator (17) is absorbed by the absorbent solution in the absorbers (3) and (4). When the absorption liquid pump (12M) is operated, the absorption liquid of which concentration becomes lower by absorbing the refrigerant is fed to the high temperature generator (5) by way of the low temperature heat exchanger (11) and the high temperature heat exchanger (10). When the absorption liquid which is passed to the high temperature generator (5) is heated by the gas burner (5B), the refrigerant is evaporated. Then, the absorption liquid having a medium concentration is passed to the low temperature generator (11) by way of the high temperature heat exchanger (10). The absorption liquid is heated by refrigerant vapor which flows from the high temperature regenerator (5) through the refrigerant pipe (18). Then, the refrigerant is evaporated and separated so that the concentration becomes higher. A temperature of the absorption liquid having the higher concentration (hereinafter referred to as a concentration) is lowered through the low temperature heat exchanger (11). Then, the absorption liquid is fed to the absorbers (3) and (4) so as to be dispersed therein.

As described above, while the absorption refrigeration system is operated, part of the absorption liquid discharged from the absorption liquid pump (12M) flows to the ejectors (47), (48) and (49) through the absorption liquid feed pipes (51), (52), (53) and (54). Consequently, the noncondensing gas in the absorber (4), the condenser (8) and the absorber (3) is drawn into the ejectors (47), (48) and (49) through the bleeding pipes (55), (56) and (57). The noncondensing gas which flows down together with the absorption liquid is separated from the absorption liquid in the separation chambers (61), (62) and (63) so as to be stored in the reservoirs (58), (59) and (60). The absorption liquid separated from the noncondensing gas flows into the absorption liquid reservoir (36) through the absorption liquid return pipe (77). The hydrogen gas which is one of the noncondensing gases stored in the reservoirs (58), (59) and (60) is discharged from the palladium cell. Other noncondensing gases cause the pressures of the reservoirs (58), (59) and (60) to be gradually increased. The discharge pump (64) is operated so that the switching valves (71) to (74) are opened to discharge the noncondensing gas to the outside when the pressures are above a predetermined pressure or every predetermined time.

During the operation of the absorption refrigeration system, if a leak is occurred in the evaporation absorption unit (1) so that a large quantity of the noncondensing gas enters the absorber (3) to increase the pressure, the noncondensing gas in the absorber (3) is drawn into the ejector (49). In addition, the noncondensing gas in the other absorber (4) and the condenser (8) is drawn into the ejectors (47) and (48) irrespective of the increase in pressure of the absorber (3) in similar to the case in which the pressure of the absorber (3) has not been increased yet. Even if the large quantity of noncondensing gas enters the absorber (4) and the condenser (8) so as to increase the pressure, the noncondensing gas in the other absorber can be bled without interference.

According to the embodiment mentioned above, when the absorption refrigeration system is operated, the noncondensing gas is drawn from the absorbers (3) and (4) and the condenser (8) into the ejectors (49), (47) and (48) separately. Even if the pressures of the absorbers (3) and (4) and the condenser (8) are different from one another, the noncondensing gas can efficiently be drawn therefrom. In addition, even if the large quantity of noncondensing gas enters the absorber (3) or (4) or the condenser (8) so that the pressure difference of the absorbers (3) and (4) and the condenser (8) becomes greater, the noncondensing gas can be bled from the ejectors (49), (47) and (48) respectively. Consequently, even if the pressure of one of the absorbers (3) and (4) and the condenser (8) is increased, the noncondensing gas can continuously be bled from the other absorber or the condenser (8) without interference. Therefore, it becomes possible to prevent a coefficient of performance of the absorption refrigeration system from being greatly reduced due to the noncondensing gas.

The present invention is not limited to the embodiment mentioned above. By way of example, the condenser (8) is not connected to the noncondensing gas tank (45) by means of the pipe but the absorbers (3) and (4) may be connected to the noncondensing gas tanks (46) and (44) by means of the pipes so that the noncondensing gas is bled from the absorbers (3) and (4) by the ejectors (49) and (47) as shown in FIG. 1. In this case, when a large quantity of the noncondensing gas enters one of the absorbers so that the pressure is increased, the noncondensing gas can continuously be bled from the other absorber. Consequently, it becomes possible to prevent the coefficient of performance of the absorption refrigeration system from being greatly reduced due to the noncondensing gas.

Furthermore, the number of the absorbers and evaporators provided on the evaporation absorption unit (1) is not limited to that of the above embodiment. By way of example, also in a case in which there are provided two evaporators which have absorbers on both sides thereof and the noncondensing gas tanks are connected to the absorbers by means of the pipes, there can be obtained the same effect as that of the above embodiment.

As described above, the absorption refrigeration system according to the present invention comprises the plurality of noncondensing gas tanks (46) and (44) which store the noncondensing gas bled from the absorbers (3) and (4) therein. Consequently, while the absorption refrigeration system is operated, the noncondensing gas in the absorbers (3) and (4) are bled to the noncondensing gas tanks (46) and (44) which are separately provided. Even if the pressure difference is made between the absorbers, the noncondensing gas can continuously be bled from the absorbers (3) and (4) by the noncondensing gas tanks (46) and (44). In addition, even if a large quantity of the noncondensing gas is generated in the absorber (3), the noncondensing gas is continuously bled from the absorber (4) by the noncondensing gas tank (44) without interference. Consequently, it becomes possible to prevent the coefficient of performance form being greatly reduced due to the generation of the large quantity of the noncondensing gas.

In case that the absorption refrigeration system comprises the plurality of noncondensing gas tanks (46), (45) and (44), and the ejectors (49), (47) and (48), the ejectors (49), (47) and (48) are connected to the absorbers (3) and (4) and the condenser (8) by means of the pipes so as to bleed the noncondensing gas from the absorbers (3) and (4) and the condenser (8). The noncondensing gas tanks (46), (45) and (44) have the ejectors (49), (47) and (48) and store the noncondensing gas therein.

During the operation of the absorption refrigeration system even if the noncondensing gas in the absorbers (3) and (4) and the condenser (8) is bled by the ejectors (49), (47) and (48) respectively so that the pressure difference is made between the absorbers and the condenser, the noncondensing gas can continuously be bled. Furthermore, even if the large quantity of the noncondensing gas is generated in the absorber (3) so that the pressure is increased, the noncondensing gas in the other absorber (4) or the condenser (8) is continuously bled by the ejectors (47) and (48) without interference and then is stored in the noncondensing gas tanks (44), (45) and (46). Consequently, it becomes possible to prevent the coefficient of performance from being greatly reduced due to the generation of the large quantity of the noncondensing gas.

Figure 3:
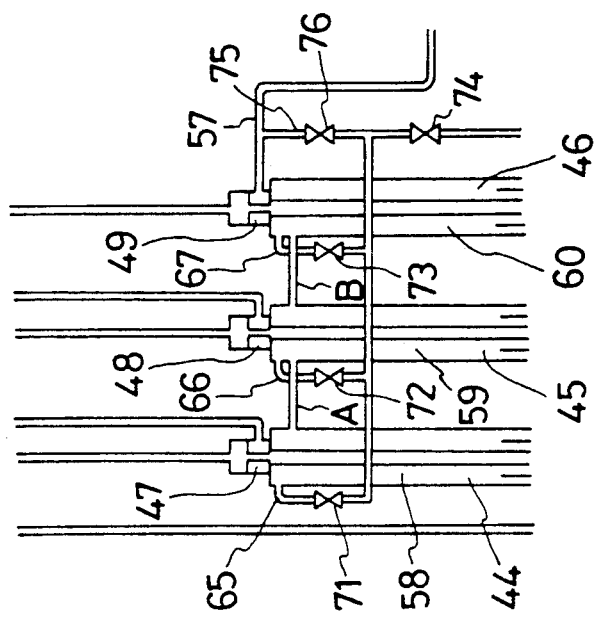
FIG. 3 is a circuit diagram of a main portion of an absorption refrigeration system according to another embodiment.

Unlike the embodiment mentioned above, a pressure equalizer may be connected among a plurality of noncondensing gas tanks. For example, a pressure equalizer (A) is connected between noncondensing gas tanks (44) and (45), while a pressure equalizer (B) is connected between noncondensing gas tanks (45) and (46) as shown in FIG. 3. In FIG. 3, the same components as those of FIG. 1 have like reference numerals.

At time of the operation of the absorption refrigeration system, the quantities of generation of the noncondensing gas in the absorbers are different from each other, a difference in quantity of the noncondensing gas to be bled to the noncondensing gas tanks (46) and (44) is made and the pressure difference is made between the noncondensing gas tanks (46) and (44), the noncondensing gas flows through the pressure equalizers (A) and (B) so that the pressure difference is eliminated. Consequently, the noncondensing gas can be stored in the noncondensing gas tanks (46) and (44) almost equally so as to be stably bled. For example, in a case in which the large amount of the noncondensing gas is generated in the absorber so as to be bled to the noncondensing gas tank (46), the noncondensing gas flows to the noncondensing gas tank (44) through the pressure equalizers (A) and (B). Consequently, it is possible to prevent the noncondensing gas tank (46) from being filled with the noncondensing gas so as to maintain fluid sealant. In addition, it is possible to prevent the coefficient of performance from being reduced due to the return of the noncondensing gas.

In a case in which the quantities of generation of the noncondensing gas in the absorbers and the condenser are different from one another, the quantities of the noncondensing gas to be bled to the ejectors (49), (47) and (48) are different from one another and the pressure difference of the noncondensing gas is made among the reservoirs (60), (58) and (59), the noncondensing gas flows through the pressure equalizers (A) and (B) so that the quantities of the noncondensing gas to be stored in the reservoirs are made almost equal. Consequently, the noncondensing gas can suitably be bled. Also in a case in which a large quantity of the noncondensing gas is generated in one of the absorbers or the condenser so that a bleeding quantity of one of the ejectors is greatly increased, the noncondensing gas flows through the pressure equalizers (A) and (B) so as to be dispersed in the reservoirs. Consequently, one of the reservoirs is filled with the noncondensing gas so that the noncondensing gas can be prevented from being returned to the evaporation absorption drum and the noncondensing gas can suitably be bled by the ejectors (49), (47) and (48).

What is claimed is:

1. An absorption refrigeration system comprising:
   an absorption refrigeration cycle, which is formed by connecting a plurality of absorbers, a regenerator, a condenser and an evaporator with one another by means of pipes;
   a plurality of noncondensing gas bleeding portions, each said portion being connected for bleeding noncondensing gas accumulated in a respective one of said plurality of absorbers; and
   a respective noncondensing gas tank connected to each of said bleeding portions for storing the noncondensing gas which is bled from the associated absorber.

2. An absorption refrigeration system according to claim 1, wherein each said noncondensing gas bleeding portion includes an ejector having a nozzle, a suction chamber and a stream-down tube, a bleeding pipe extending from a top portion of the associated absorber to the suction chamber, and an absorption liquid feed pipe extending from a bottom portion of the absorber to the nozzle through an absorption liquid pump for pressurizing and supplying an absorption liquid in the absorber to the nozzle, said ejector sucking and bleeding the noncondensing gas accumulated in the absorber into the suction chamber.

3. An absorption refrigeration system according to claim 2, wherein each said noncondensing gas tank is provided with a reservoir for storing the noncondensing gas bled through the bleeding pipe and the ejector, the reservoir having a separation portion for separating the noncondensing gas from the absorption liquid.

4. An absorption refrigeration system according to claim 3, wherein an absorption liquid return pipe extends from the separation portion of the reservoir to the associated absorber for returning refrigerant liquid, which is condensed and separated in the separation portion, to the absorber.

5. An absorption refrigeration system comprising:
   absorption refrigeration cycle, which is formed by connecting a plurality of absorbers, a regenerator, a condenser and an evaporator with one another by means of pipes;
   a plurality of noncondensing gas bleeding portions, each said portion being connected for bleeding noncondensing gas accumulated in a respective one of said plurality of absorbers and said condenser;
   a respective noncondensing gas tank connected to each of said bleeding portions for storing the noncondensing gas which is bled from the associated absorber and condenser.

6. An absorption refrigeration system according to claim 5, wherein each said noncondensing gas bleeding portion includes an ejector having a nozzle, a suction chamber and a stream-down tube, a bleeding pipe extending from a top portion of each absorber to the suction chamber of the associated bleeding portion, another bleeding pipe extending from the condenser to the suction chamber of the associated bleeding portion, an absorption liquid feed pipe extending from a bottom portion of the absorber to the nozzle through an absorption liquid pump for pressurizing and supplying an absorption liquid in the absorber to the nozzle, said ejector sucking and bleeding the noncondensing gas stored in the associated absorbers and the condenser into each suction chamber.

7. An absorption refrigeration system according to claim 6, wherein each said noncondensing gas tank is provided with a reservoir for storing the noncondensing gas bled through the bleeding pipe and the ejector, the reservoir having a separation portion for separating the noncondensing gas from the absorption liquid.

8. An absorption refrigeration system according to claim 7, wherein an absorption liquid return pipe extends from the separation portion of the absorber to the associated absorber for returning refrigerant liquid, which is condensed and separated in the separation portion, to the absorber.

9. An absorption refrigeration system according to claim 5, further comprising a pressure equalizer provided between the noncondensing gas tank provided for one said absorber and the noncondensing gas tank provided for said condenser.

10. An absorption refrigeration system comprising:
    an absorption refrigeration cycle, which is formed by connecting a plurality of absorbers, a regenerator, a condenser and an evaporator with one another by means of pipes;
    a plurality of noncondensing gas bleeding portions, each said portion being connected for bleeding noncondensing gas accumulated in a respective one of said plurality of absorbers;
    a respective noncondensing gas tank connected to each of said bleeding portions for storing the noncondensing gas which is bled from the associated absorber; and
    a pressurized equalizer provided between the noncondensing gas tank provided for one absorber and the noncondensing gas tank provided for another absorber.

* * * * *